(12) United States Patent
Runfola

(10) Patent No.: US 7,216,918 B1
(45) Date of Patent: May 15, 2007

(54) VEHICLE SUN VISOR COVER

(76) Inventor: Peter G. Runfola, 26 Duane Ter., Buffalo, NY (US) 14214

( * ) Notice: Subject to any disclaimer, the term of this patent is extended or adjusted under 35 U.S.C. 154(b) by 0 days.

(21) Appl. No.: 10/833,447

(22) Filed: Apr. 28, 2004

(51) Int. Cl.
 *B60J 3/02* (2006.01)
(52) U.S. Cl. .................. 296/97.6; 296/97.9; 296/97.11
(58) Field of Classification Search .... 296/97.1–97.13; 160/DIG. 3; 224/312
See application file for complete search history.

(56) References Cited

U.S. PATENT DOCUMENTS

| | | | | |
|---|---|---|---|---|
| 2,432,674 | A | * | 12/1947 | Office ........................ 296/97.5 |
| 3,649,068 | A | * | 3/1972 | Moynihan ................... 296/97.8 |
| 3,809,428 | A | * | 5/1974 | Cohen ........................ 296/97.5 |
| 4,391,053 | A | | 7/1983 | Anthony |
| 4,489,974 | A | * | 12/1984 | Warhol ...................... 296/97.5 |
| 4,781,409 | A | * | 11/1988 | Harbison ................... 296/97.6 |
| 4,944,971 | A | * | 7/1990 | McLaughlin .............. 428/34.9 |
| D309,756 | S | | 8/1990 | Lothridge |
| 5,076,634 | A | * | 12/1991 | Muller et al. .............. 296/97.5 |
| 5,330,085 | A | | 7/1994 | Horensky et al. |
| 5,429,335 | A | | 7/1995 | Cunningham |
| 5,590,827 | A | * | 1/1997 | Nimpoeno ................. 224/312 |
| 5,651,577 | A | * | 7/1997 | Lacy et al. ................. 296/97.6 |
| 5,730,484 | A | * | 3/1998 | Robinson ................... 296/97.6 |
| 5,871,251 | A | * | 2/1999 | Welling et al. ............ 296/97.5 |
| 5,882,059 | A | * | 3/1999 | Romero ...................... 296/97.6 |
| 5,943,805 | A | | 8/1999 | Huang et al. |
| 6,231,108 | B1 | * | 5/2001 | Nicol .......................... 296/97.6 |
| 6,264,265 | B1 | * | 7/2001 | Hestehave et al. ......... 296/97.6 |
| 6,276,081 | B1 | | 8/2001 | Shedd |
| 6,659,529 | B2 | * | 12/2003 | Palmer et al. ............. 296/97.6 |
| 6,705,661 | B2 | * | 3/2004 | Amirmoini ................ 296/97.6 |
| 6,824,188 | B1 | * | 11/2004 | Brown et al. .............. 296/97.2 |
| 6,959,956 | B1 | * | 11/2005 | Fero et al. ................. 296/97.5 |

\* cited by examiner

*Primary Examiner*—D. Glenn Dayoan
*Assistant Examiner*—Glen Blankenship
(74) *Attorney, Agent, or Firm*—James C. Simmons

(57) ABSTRACT

A cover for a vehicle sun visor. The cover comprises a sleeve in which the sun visor is receivable through an open end thereof. The sleeve is elasticized to allow stretching of said sleeve for easily receiving and removal of the sun visor and to effect gripping of the received sun visor by the sleeve. A rear panel of the sleeve has an access opening which allows access to accessories on the sun visor. A flap panel preferably covers the rear panel and has one edge which is secured thereto and another edge which is releasably securable thereto so as to be liftable therefrom to allow access to the access opening. A front panel of the sleeve and the flap panel have indicia thereon or a surface upon which indicia can be provided.

20 Claims, 4 Drawing Sheets

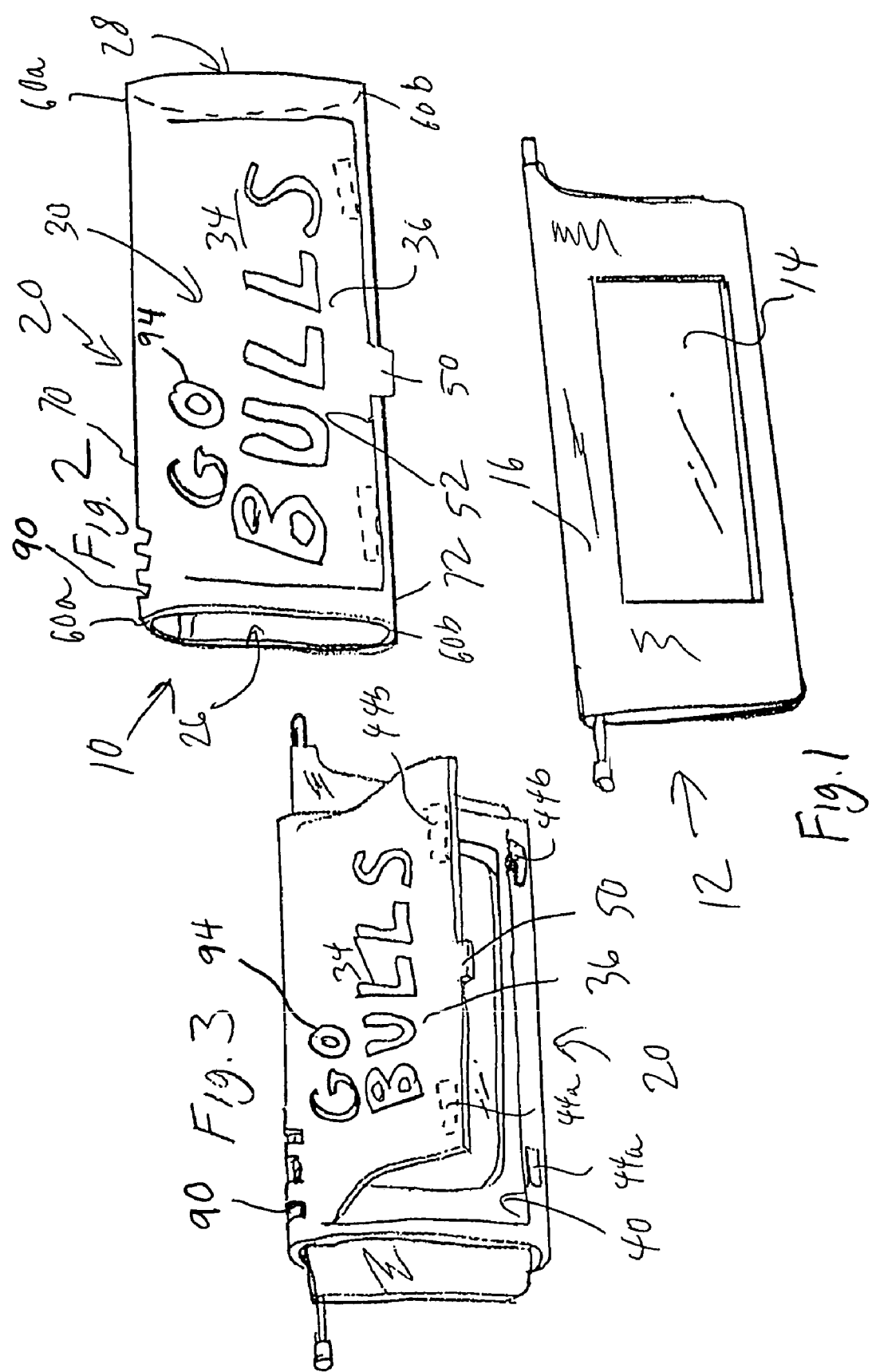

VEHICLE SUN VISOR COVER

The present invention relates generally to vehicle accessories. More particularly, the present invention relates to a cover for an automobile or other vehicle sun visor for displaying messages, advertisements, team logos, artistic impressions, and other indicia (information).

Automobile owners often desire to display their support for a particular sports team, cause, etc. However, bumper stickers are difficult to remove, and decals or other window-clinging devices are often small in size, the latter having to be removed and repositioned any time a vehicle owner wished to clean his or her automobile windows. In view of these difficulties, a desirable alternative for such display would be on covers which are easily attachable to and removable from sun visors.

U.S. Pat. No. 4,944,971 discloses an automobile sun visor slip cover upon which advertising material or the like can be placed. The cover includes a deformable hollow body that has an opening along a side in which the sun visor is receivable to be encased by the cover. The cover body includes portions which are heat shrinkable and portions which are stretchable. Heat from a hand-held hair dryer is applied to the cover to shrink those heat-shrinkable portions to securely encase the sun visor. Such a cover is not easy to attach or remove and does not provide access to accessories such as mirrors on the sun visor.

Examples of various other sun visor covers or accessories that have been proposed are found in U.S. Pat. Nos. 4,391,053; 4,781,409; 5,330,085; 5,429,335; 5,943,805; 6,276,081; and Des309,756. Sun visor covers provided in these references are not easy to install or remove, do not provide access to accessories on the sun visor, and/or otherwise fail to achieve the advantages of the present invention.

Sun visor covers have been provided which have a panel (with pockets to hold items) which lies against a rear-facing surface of a visor and which have a pair of straps which extend around the visor to hold the cover in place. A strap comprises a pair of strap members which are attachable by hook and pile fasteners. In a similar product, a CD visor organizer provided by Action Sports Image, LLC of Concord, NC, a pair of elastic bands extend around the visor to hold the cover in place. The cover includes a sports logo as well as CD pockets. Such covers undesirably are not able to display advertising or sports indicia or the like toward both the front and the rear. Nor are such covers able to, when the sun visor is pivoted to block incoming sun streaming in from the driver's left side when seated behind the steering wheel, display indicia toward traffic driving along the right side of the vehicle in a parallel lane, for instance, while passing another vehicle. Moreover, such covers do not adequately secure the cover to the visor and result in unsightly display of the front surface of the visor.

It is accordingly an object of the present invention to provide a sun visor cover which allows advertising or other indicia to be displayed forwardly and/or rearwardly of the sun visor (which includes display to one or both sides of the automobile when the sun visor is pivoted to block incoming sun light streaming in from the driver's left side when seated behind the steering wheel or from a passenger's right side), which is easily attachable to and removable from the sun visor, and which provides access to accessories which may be found on the sun visor, such as, for example, reading lights, makeup mirrors, and buttons built into the sun visor to be programmed for opening a garage door.

It is a further object of the present invention to allow advertising or other indicia to be displayed both forwardly and rearwardly of the sun visor.

In order to achieve the above objects, in accordance with the present invention, a sun visor cover is provided which comprises a sleeve in which the sun visor is receivable, the sleeve having two ends at least one of which is open for receiving the sun visor and including front and rear panels sized for covering front and rear surfaces respectively of the sun visor and including elastomeric material for elasticizing the sleeve to allow stretching of the sleeve for receiving of the sun visor and to effect gripping of the received sun visor by the sleeve, the rear panel having an access opening therein sized to allow access to accessories on the sun visor.

In accordance with an aspect of the present invention, in order to allow indicia on both the front and rear panels, the cover further comprises a third panel sized to cover the rear panel and being attached to the rear panel along one edge of the rear panel and detachably attachable to the rear panel along the opposite edge.

The above and other objects, features, and advantages of the present invention will be apparent in the following detailed description of the preferred embodiment thereof when read in conjunction with the accompanying drawings wherein the same reference numerals denote the same or similar parts throughout the several views.

BRIEF DESCRIPTION OF THE DRAWINGS

FIG. 1 is a perspective view of a typical automobile sun visor.

FIG. 2 is a perspective view of the rear side of a sun visor cover which embodies the present invention, with a closed flap.

FIG. 3 is a perspective view of the rear side of the cover installed on the sun visor and with the flap partially opened.

DETAILED DESCRIPTION OF THE PREFERRED EMBODIMENT

Figure 4:
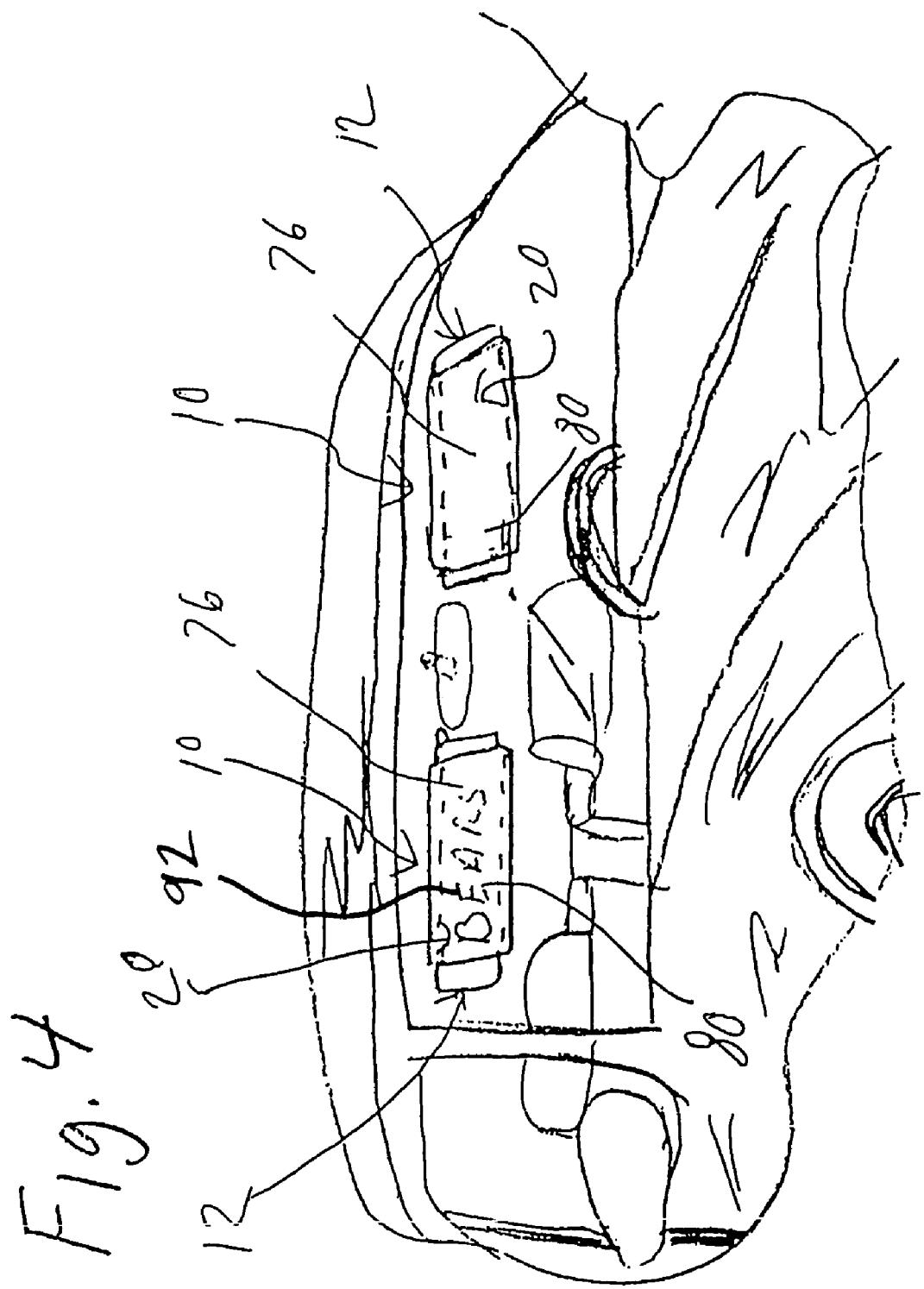
FIG. 4 is a perspective view of the front side of two of the cover, one with indicia and one without indicia, installed on sun visors.

Referring to FIGS. 1 to 4, there is shown generally at 12 a typical automobile sun visor having a lighted mirror 14 on the rear visor surface 16 thereof. As used herein and in the claims, the terms "rear" and "front", or variants thereof, are meant to refer to the surface of a visor or cover thereon which faces rearwardly and forwardly respectively of the vehicle in which the visor is located when the visor is lowered to a position for blocking sun light. As used herein and in the claims, the terms "top" and "bottom", or variants thereof, are meant to refer to locations on the visor and cover when the visor is lowered to a position for blocking sun light. An accessory in the form of a sun visor cover, illustrated generally at 10, is provided for the sun visor 12. The cover 10 is composed of fabric or other suitable material, preferably washable. While the present invention is intended to be used primarily on automobiles, it should be understood that it may also be used on other vehicles such as, for example, semi-trucks.

The cover 10 includes an elasticized fabric (or other suitable material) sleeve, generally illustrated at 20, sized to surround and securely grip onto the mid-portion of the sun visor 12, covering substantially the entirety of the sun visor 12. Thus, the sleeve 20 may be composed entirely of washable stretch-cloth material or, as described hereinafter, non-elastomeric material to which elastomeric material is sewed to elasticize the sleeve 20. The cover 10 is preferably composed of washable material. Notched sections, illustrated at 90, may suitably be provided in the top edge of the cover 10 to suitably allow for a male latch on the visor to mate with a female latch on the vehicle roof.

The fabric sleeve 20 is open at both ends 26 and 28. A first side surface 30 of sleeve 20 includes a flap member 34 having a decoratable outwardly facing surface area 36 thereon and is securable in a down position, as illustrated in FIG. 2, in a manner to cover an access opening 40 provided through the first side surface 30 of the sleeve 20 by two pairs of mating Velcro (or other suitable) hook and pile fasteners 44a and 44b. Flap member 34 is composed of non-elastomeric material but may alternatively be composed of stretch-cloth material.

Flap member 34 is liftable into an up position, as illustrated in FIG. 3, to allow access to opening 40 by grasping and pulling on a lifting tab 50 provided along a bottom edge 52 of flap member 30 such that a user may access mirror 14 or other accessory provided on the rear surface of the sun visor 12.

Each of the open ends 26 and 28 has elastic bands 60a and 60b respectively provided to extend along the upper and lower edges 70 and 72 thereof for allowing the sleeve to be stretched to be fitted onto the sun visor 12 and for effecting gripping of the sun visor 12 by the sleeve to securely hold the sleeve 20 on the sun visor 12.

A second side surface 76 of the sleeve 20 is provided with a decoration area 80 which may be decorated with indicia, illustrated at 92, which, for the purposes of this specification and the claims, is defined as markings including, but not limited to, messages, advertisements, advertising logos, artistic impressions, sports logos, sports team rally statements, event notices, vehicle sales information (for example, For sale, low miles, one owner), popular cartoon characters, promotional give-aways, designer labeling, personalized messages, or may be left plain. The outwardly facing surface of the flap member 34 may also be decorated with indicia 94 or left plain. The indicia 92 and 94 may be provided by silk screened imprinting or other suitable process.

Figure 5:
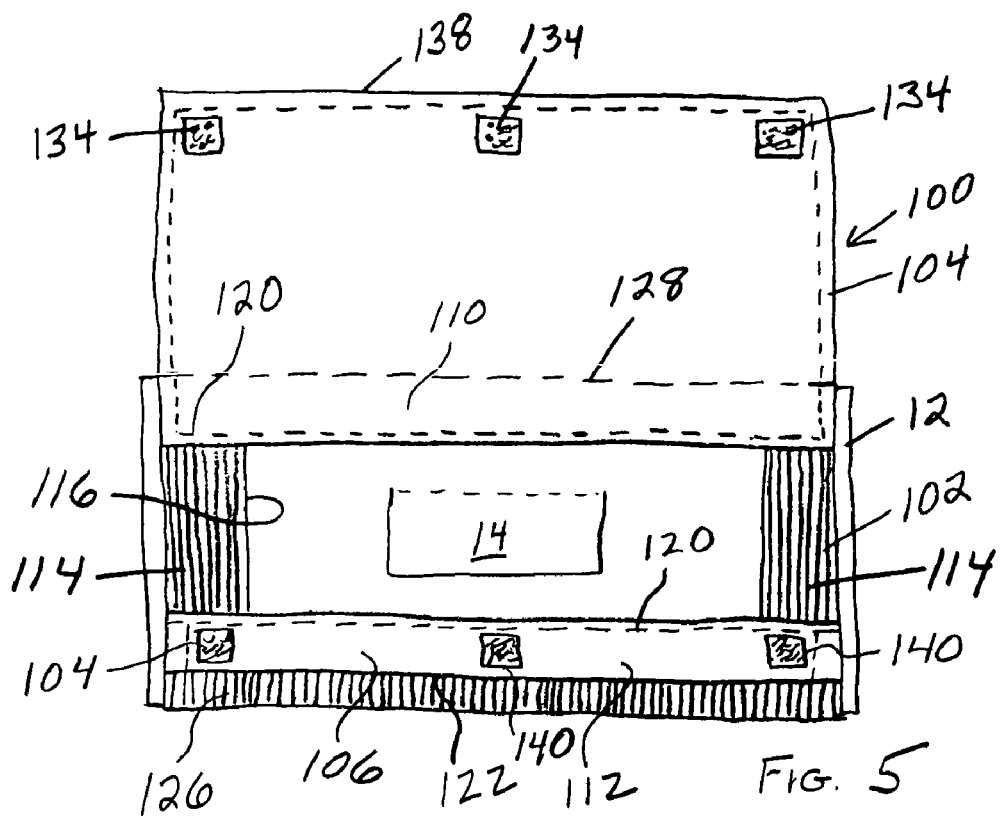
FIG. 5 is a perspective view of the rear side of an alternative embodiment of the cover installed on the sun visor with a flap member opened up.
Figure 6:
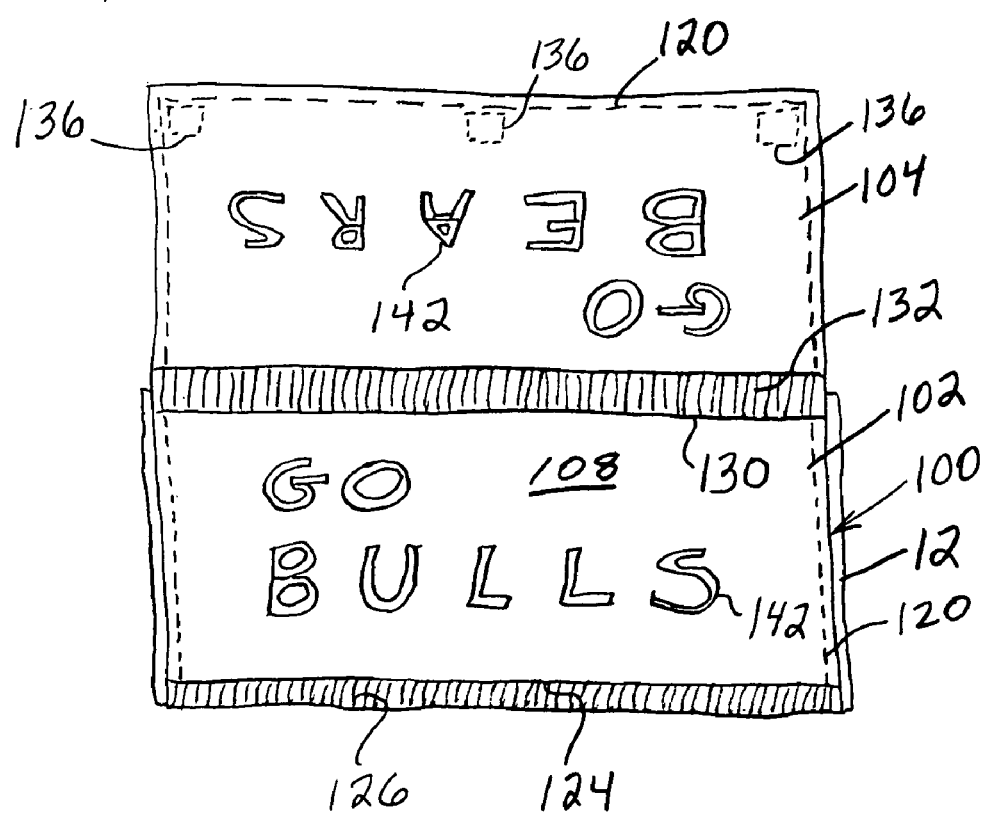
FIG. 6 is a perspective view of the front side of the cover of FIG. 5 installed on the sun visor with a flap member opened up.

Referring to FIGS. 5 and 6, there is shown generally at 100 a fabric (or other suitable material) cover including a sleeve 102 to which is attached (as hereinafter described) a flap member 104.

The sleeve 102 includes a rear panel 106 and a front panel 108. The rear panel 106 comprises upper and lower strips 110 and 112 respectively of non-elastomeric fabric (or other suitable non-elastomeric material) joined at each end by an elastomeric strip 114 as by stitching 120 which also serves for hem stitching, thereby defining therebetween an access opening, illustrated at 116, for gaining access to the mirror 14 or other accessories on the sun visor 12. The front panel 108 is composed of non-elastomeric fabric (or other suitable non-elastomeric material). Stitching 120 throughout the cover 100 is preferably reinforced double stitching.

The lower edges 122 and 124 of panels 106 and 108 respectively are joined, as by stitching 120, by a strip 126 of elastomeric material, and the upper edges 128 and 130 thereof are similarly joined by another strip 132 of elastomeric material to allow the thus elasticized sleeve 102 to be stretched so that the sun visor 12 can be easily received therein as well as removed therefrom and so that the sleeve 102 may snugly grip the received sun visor 12.

The flap panel 104 is composed of non-elastomeric fabric (or other suitable) material and is suitably stitched to the upper edge 128 by stitching 120 so that it may fold (open) upwardly to provide access to the access opening, as illustrated in FIG. 5. A plurality of Velcro (or other suitable) hook and pile fasteners (or other suitable fasteners) 134 are sewed, as illustrated at 136, or otherwise suitably attached to the flap panel 104 adjacent the lower edge 138 thereof to mate with similar fasteners 140 on the fabric strip 112 to secure the flap panel 104 in a closed position.

Desirably, the non-elastomeric fabric used for the cover 100 is a double layer of fabric. Stiffening rods (not shown) may be sewn into the lower and upper edges (those edges facing the opening 116) of strips 110 and 112.

The resulting cover 100 is open at both ends. However, it should be understood that it need be open at only one end. Moreover, an open end may be closed by, for example, a zipper after the sun visor 12 is received within the cover 100. For the purposes of the claims, such an open end which is closable by a zipper or the like is still defined as an open end.

Referring to FIG. 6, indicia 142, which may be similar to indicia 92 and 94, may be provided on the outwardly facing surfaces of the front and flap panels 108 and 104 respectively. If desired, one or both of the surfaces may be left blank. It is contemplated that customers may desire that pockets or the like be provided in the cover for keeping small items.

Figure 7:
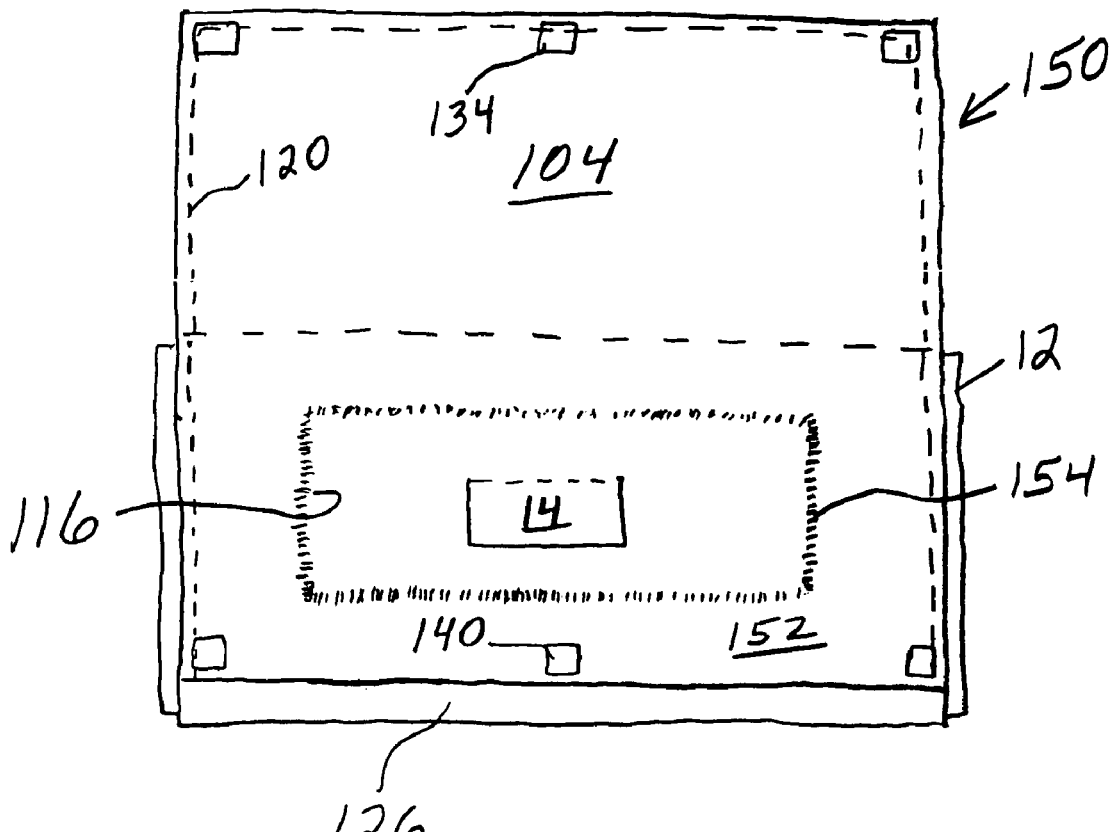
FIG. 7 is a view similar to that of FIG. 5 of an alternative embodiment of the cover.

Referring to FIG. 7, there is shown generally at 150 a cover wherein the rear panel 152 comprises a single piece of non-elastomeric material providing the access opening 116. The material of panel 152 may be serged (or otherwise suitably stitched), as illustrated at 154, around the opening 116. For aesthetic purposes, the elastomeric material may be colored and/or textured to match that of the non-elastomeric material. The cover 150 is otherwise similar to cover 100. If desired, covers 100 and 150 may be provided with a lifting tab similar to lifting tab 50.

As shown in the various embodiments, the sleeve can be elasticized in various ways, for example, in FIG. 5, one of the elastomeric strips 126 and 132 may be eliminated. For another example, the sleeve panels may comprise a single piece of non-elastomeric material with opposite ends joined by a strip of elastomeric material. For another example, the front and flap panels may comprise a single piece of non-elastomeric material.

The sun visor cover according to the present invention may have additional advantages. Thus, when installed on newer vehicles, it may assist in ameliorating the deleterious effects of sunshine on the fabric covering of the sun visor. Thus, if the cover is kept in place by the vehicle owner throughout ownership of the vehicle, the owner may be able to reap a higher trade-in value when and if he or she one day decides to use the vehicle as trade-in for a different vehicle. With the cover in place during shipment and transit of brand new vehicles, sun damage may advantageously be prevented occurring. Nor would the visor fabric be subject to marring due to dirty hands of any of those involved in shipping or delivering vehicles or due to those looking over the vehicle, touching this and that, in an effort to determine if they would like to purchase the vehicle.

Often, when a fan of a sports team is inclined to purchase a souvenir of the team (i.e., fly his or her team colors), he or she is motivated by a passion for the team. I believe that someone purchases such a souvenir because that person is particularly passionate about the team and has an emotional bond to the team, i.e., because thinking about the team and being surrounded by the team's image imparts a certain camaraderie, a feeling like he or she is part of the team in some way. Thus, he or she may enjoy looking at the souvenir from time to time. The visor cover, having both forward and rearward indicia as well as being viewable from both sides of the vehicle when the visor is pivoted to the side, would allow him or her to effortlessly look at the souvenir from time to time, i.e., it is not stuck on the back of his or her bumper solely for the enjoyment of others to view, now is it stuck in the corner of a window, out of his or her view and glanced at only by happenstance now and then.

Thus, there is provided a vehicle sun visor cover which desirably comprises a sleeve made of non-elastomeric material so that indicia can be provided to face forwardly (to be viewed through the windshield) and/or rearwardly (as well as sidewardly to one or both sides when the driver or passenger pivots the sun visor to block sun entering the vehicle from the left and/or right side respectively), preferably both forwardly and rearwardly, wherein the cover comprises a sleeve which is elasticized so that it may be easily slipped over and removed from the visor yet be snugly retained thereon and wherein an access opening may be provided to a mirror or the like on the visor, the access opening being preferably covered by a flap panel.

It should be understood that, while the present invention has been described in detail herein, the invention can be embodied otherwise without departing from the principles thereof, and such other embodiments are meant to come within the scope of the present invention as defined by the appended claims.

What is claimed is:

1. A cover for a vehicle sun visor, the cover comprising a sleeve in which the sun visor is receivable, said sleeve having two ends at least one of which is open for receiving the sun visor and including front and rear panels composed of non-elastic material and sized for at least partially covering front and rear surfaces respectively of the sun visor and including elastomeric material disposed for elasticizing said sleeve to allow stretching of said sleeve for receiving of the sun visor and to effect gripping of the received sun visor by the sleeve, said rear panel having an access opening therein in the form of a cut out which is sized to allow access to at least one accessory on the sun visor, and said elastomeric material including at least two strips of elastomeric material extending parallel to said ends.

2. A cover according to claim 1 further comprising indicia on said front panel.

3. A cover according to claim 1 further comprising a third panel sized to cover said rear panel and being attached to said rear panel along one edge of said rear panel and detachably attachable to said rear panel along an edge of said rear panel which is opposite to said one edge.

4. A cover according to claim 3 further comprising indicia on both of said front and third panels.

5. A cover according to claim 3 wherein said third panel is composed of non-elastomeric material, and said elastomeric material includes at least one strip of elastomeric material interposed between and attached to said front and rear panels.

6. A cover according to claim 3 wherein said third panel is composed of non-elastomeric material, and said elastomeric material comprises a first elastomeric strip interposed between and attached to top edges of said front and rear panels and a second elastomeric strip interposed between and attached to bottom edges of said front and rear panels.

7. A cover according to claim 3 further comprising at least one hook and pile fastener detachably attaching said third panel to said rear panel along said opposite edge.

8. A cover according to claim 1 wherein said rear panel comprises a top strip of non-elastomeric material, a bottom strip of non-elastomeric material, and said at least two strips of elastomeric material extending between and attached to said top and bottom strips and defining therewith said access opening.

9. A cover according to claim 1 wherein said cover is composed of fabric.

10. A cover according to claim 1 wherein both said ends of said fabric sleeve are open.

11. A vehicle accessory adapted for securement to a sun visor of a vehicle, the vehicle accessory comprising:
    an elasticized fabric sleeve sized to surround and securely grip onto a sun visor of a vehicle, said sleeve including front and rear panels composed of non-elastomeric fabric material and sized for at least partially covering front and rear surfaces respectively of the sun visor, and elastomeric material disposed for elasticizing the cover to allow stretching of the cover for receiving and removing of the sun visor and to effect gripping of the received sun visor by the cover;
    the elasticized fabric sleeve having a pair of ends both of which are open, and the rear panel has an access opening therein;
    the elasticized fabric sleeve further includes a flap member having a decoratable outwardly facing surface area thereon and which is secured to the rear panel along a top edge of the flap member such that the flap member is securable in a down position in a manner to cover the access opening;
    the flap member being detachably attachable to the fabric sleeve along a bottom edge of the flap member so as to be held in the down position and to be liftable from the down position to allow access to at least one accessory on the sun visor;
    the front panel of the sleeve having a decoratable area thereon; and
    said elastomeric material including at least two strips of elastomeric material extending parallel to said ends.

12. An accessory according to claim 11 wherein the flap member is composed of non-elastomeric material.

13. An accessory according to claim 11 further comprising indicia on the flap member and the front panel of the sleeve.

14. An accessory according to claim 11 further comprising hook and pile fasteners for holding the flap member in the down position and a lifting tab on a bottom edge of the flap member for lifting the flap member from the down position to access an accessory on the sun visor.

15. A fabric cover for a vehicle sun visor, the cover having two ends at least one of which is open for receiving the sun visor and including front and rear panels composed of non-elastomeric fabric material and sized for at least partially covering front and rear surfaces respectively of the sun visor, and elastomeric material disposed for elasticizing the cover to allow stretching of the cover for receiving and removing of the sun visor and to effect gripping of the received sun visor by the cover, and said elastomeric material including at least two strips of elastomeric material extending parallel to said ends.

16. A fabric cover according to claim 15 further comprising a third fabric panel sized to cover said rear fabric panel and attached to said rear panel along one edge of said rear panel and detachably attachable to said rear panel along an edge of said rear panel which is opposite to said one edge.

17. A fabric cover according to claim 15 wherein said elastomeric material comprises at least one elastomeric strip which is interposed between and attached to said panels.

18. A fabric cover according to claim 17 wherein said rear panel has an access opening therein in the form of a cut out which is sized to allow access to at least one accessory on the sun visor.

19. A fabric cover according to claim 15 wherein said rear panel has an access opening therein in the form of a cut out which is sized to allow access to at least one accessory on the sun visor.

20. A fabric cover according to claim 15 further comprising indicia on at least one of said panels.

\* \* \* \* \*